UNITED STATES PATENT OFFICE.

HENRY S. McLEOD, OF CAMBRIDGE, MASSACHUSETTS.

WELDING COMPOUND.

SPECIFICATION forming part of Letters Patent No. 427,786, dated May 13, 1890.

Application filed March 14, 1890. Serial No. 343,921. (No specimens.)

*To all whom it may concern:*

Be it known that I, HENRY S. MCLEOD, of Cambridge, in the county of Middlesex, State of Massachusetts, have invented certain new and useful Improvements in Welding Compounds, of which the following is a description sufficiently full, clear, and exact to enable any person skilled in the art or science to which said invention appertains to make and use the same.

My invention relates to a compound which is especially adapted for use in welding steel and iron; and it consists in a novel combination of ingredients whereby a cheap, simple, and more effective article for this purpose is formed than is now in ordinary use.

The nature of the improvement will be readily understood by all conversant with such matters from the following explanation.

The mixture is compounded substantially in accordance with the following formula: ground borax, one part; pulverized borax, one part; salt, one part; iron filings or chips, one part.

In the use of my improved compound in welding steel the steel is heated until red and a thin coating of the compound is then applied to the parts which are to be joined together. Said parts are then again heated to a "bright red," removed from the fire, and scarfed in the usual way. A thin coating of the compound is then again applied to the hot parts, as before, after which they are returned to the fire and heated sufficiently to enable them to be withdrawn and welded in the ordinary manner.

The salt in the compound destroys or absorbs the water and gas which is given off from the steel while heating and produces much better welding-surface than where borax alone is employed. Moreover, the steel while being heated when borax is used rapidly loses its temper. It is found that by employing salt the steel will hold its temper in the welded portion throughout the process.

In welding cast-iron it is only necessary to apply the compound to the heated parts once before drawing and pressing them together. Cast-iron and steel may also be welded in the same manner as two parts of cast-iron by the use of my improvement.

My improvement may be employed to purify and toughen cast-iron.

To a small quantity of the molten iron about one pound of the compound is added for every one hundred pounds of iron. This is mixed in the molten mass, and it is found that the gas therein is rapidly released thereby. The refuse matter and impurities in the iron float to the top, where they may be skimmed off before pouring the molten iron into the molds.

Having thus explained my invention, what I claim is—

1. A welding compound comprising borax, salt, and iron chips or filings, combined substantially in the proportions specified.

2. A welding compound comprising equal parts of ground borax, pulverized borax, salt, and iron chips or dust, substantially as set forth.

HENRY S. McLEOD.

Witnesses:
O. M. SHAW,
K. DURFEE.